United States Patent [19]
Jones

[11] Patent Number: 5,897,802
[45] Date of Patent: Apr. 27, 1999

[54] HEATED DEBRIS SHIELD

[76] Inventor: Robert C. Jones, 2760 Montclare Ct., Aurora, Ill. 60504

[21] Appl. No.: 08/763,067

[22] Filed: Dec. 10, 1996

[51] Int. Cl.⁶ ...................................................... B60L 1/02
[52] U.S. Cl. ............................................................ 219/202
[58] Field of Search .................................... 219/202, 495, 219/486, 492, 219, 213; 280/154; 340/581, 905

[56] References Cited

U.S. PATENT DOCUMENTS

| | | |
|---|---|---|
| 2,325,901 | 8/1943 | Atkinson . |
| 2,787,694 | 4/1957 | Farries . |
| 2,992,317 | 7/1961 | Hoffman . |
| 3,781,526 | 12/1973 | Damron ................................. 219/538 |
| 3,982,092 | 9/1976 | Marriott ................................. 219/203 |
| 4,222,044 | 9/1980 | Boschung ................................ 340/581 |
| 4,436,319 | 3/1984 | Clutter . |
| 4,591,178 | 5/1986 | Mortvedt et al. ....................... 280/154 |
| 4,603,451 | 8/1986 | VanSickle ................................ 219/203 |
| 4,638,960 | 1/1987 | Straube et al. .......................... 219/497 |
| 4,735,428 | 4/1988 | Antekeir ................................ 280/454 |
| 5,080,397 | 1/1992 | Metcalf . |
| 5,418,522 | 5/1995 | Freundlieb et al. .................... 340/581 |
| 5,619,193 | 4/1997 | Doherty ................................ 340/905 |
| 5,657,951 | 8/1997 | Giamati ............................. 219/121.66 |
| 5,710,408 | 1/1998 | Jones ...................................... 219/481 |

FOREIGN PATENT DOCUMENTS

| | | | |
|---|---|---|---|
| 2024557 | 3/1992 | Canada ...................................... 25/16 |
| 2514489 | 10/1976 | Germany . |
| WO 89/11412 | 11/1989 | WIPO ........................................ 25/16 |

*Primary Examiner*—Teresa Walberg
*Assistant Examiner*—Vinod D. Patel
*Attorney, Agent, or Firm*—Wallenstein & Wagner, Ltd.

[57] ABSTRACT

A heated debris shield apparatus, comprising a body, a heating element connected to the body, and a means for controlling the supply of power to the heating element.

4 Claims, 6 Drawing Sheets

HEATED DEBRIS SHIELD

DESCRIPTION

1. Technical Field

The present invention relates generally to shields for aiding in the removal, or preventing the accumulation of frozen debris on wheeled or tracked vehicles. More specifically, the present invention relates to the efficient removal of snow and frozen debris by means of a shield having a heating element connected to a power source, and which may be controlled by various combinations of temperature sensing devices, moisture sensing devices, temperature/time devices, resistive temperature devices and a comparative unit.

2. Background Art

The reduction of water spray and the elimination of frozen build-up near vehicle tires is a problem with nearly all vehicles. The need for an efficient apparatus for effecting such removal has arisen on both wheeled and tracked vehicles, as well as other ground engaging devices.

Traditionally, mud flaps or splash guards are placed behind a vehicle's tire to prevent water and other debris from being sprayed upon following vehicles during travel. However, by placing these traditional devices behind a vehicle's tire, it creates several recurring problems. First, once a guard is placed near a vehicle's tire, it acts as a shield and reduces the area in which snow or other liquid or debris propelled off of a vehicle's tire can be displaced. Second, by acting as a shield and reducing the throw-off area, the guard initially stops the wheel-propelled liquid and debris and is momentarily in contact with the liquid while it flows off the shield and onto the ground. However, this reduction in throw-off area and momentary contact with the liquid and debris promotes the formation and accumulation of snow and ice during freezing conditions. Thus, after freezing begins, these devices are unable to eliminate the frozen build up at any stage of the accumulation.

Once snow or other frozen debris begins to accumulate, it eventually forms a solid chunk of ice attached to the vehicle proximate its ground engaging means. The ice chunk may then become dislodged while in travel. This causes a hazardous condition for following vehicles as the ice chunk either slides along the ground or provides an obstacle in the middle of the road. Even if the ice chunk does not dislodge during travel, it is likely to do so after the vehicle is stored in a garage and is exposed to above-freezing temperatures. Upon melting, the ice chunk becomes a pool of discolored water and sludge on the garage floor.

U.S. Pat. No. 4,436,319 issued Mar. 13, 1984 to Clutter, discloses using a flexible double-wall construction shield. This device attempts to free any ice or other frozen debris collected therein by permitting flexing of the guard. This is accomplished through molding a double walled splash guard from a flexible lightweight plastic. FIG. 5a of Clutter shows the use of slots (Reference Nos. 33 and 25) in a first wall (Reference Nos. 16 and 18) which lead to a cavity (See FIG. 7), through which water is to flow. However, this construction provides two surfaces and a channel where water may freeze. Thus, as with standard mud flaps, this construction allows snow or other frozen debris to freeze and ultimately accumulate, forming an ice chunk.

U.S. Pat. No. 4,436,319, further discloses de-icing wires molded directly into the plastic during construction, providing a second method of removing ice. However, the '319 patent does not solve the problem of providing a power source. Moreover, the '319 patent does not disclose the use of either a temperature sensing device, a moisture sensing device, a temperature versus time device or a comparative unit in connection with the device.

SUMMARY AND OBJECTS OF THE INVENTION

The present invention provides an apparatus to substantially reduce the accumulation and build up of frozen debris in a wide range of applications.

Another object of the present invention is to facilitate the removal of frozen debris proximate a vehicle's ground engaging means.

Another object of the present invention is to provide a debris shield employing a heating element.

Another object of the present invention is to provide a debris shield employing a heating element and further connected to a power source.

Another object of the present invention is to provide a vehicular debris shield embodying a temperature sensing device, a moisture sensing device and a comparator for controlling power to the heating element.

Accordingly, the present invention provides an apparatus embodying a simple, controllable, electro-mechanical solution to the problem of the accumulation of frozen debris proximate to a vehicle's ground engaging means. Broadly stated, the present invention integrates a debris guard function, a heating function, and a temperature sensing function into a single device. However, unlike the devices taught in the prior art, the present invention provides an apparatus wherein the heating function of the debris shield is controlled through the use of electro-mechanical devices.

Introducing temperature and moisture level sensing devices to a heated debris guard has several advantages. First, when controlled by a comparator, the apparatus is self-activating, turning itself on during cold and humid periods where freezing is likely to occur. Second, the apparatus is more efficient because it will always turn on when required, rather than having to depend on the operator to turn the device on, thus eliminating the possibility of operator error. Third, the self-activating device will only supply power to the heating element when required, thereby reducing the time that current will be flowing through the heating element when not required and ultimately increasing the lifespan of the heating element. Fourth, by having this apparatus on vehicles, it creates a safer roadway environment and helps owners and operators to maintain cleaner and safer vehicles. This apparatus can easily be factory installed on new vehicles or can be retro-fitted and installed on existing vehicles.

In addition, introducing a resistive temperature detector ("RTD") to the present invention creates an additional means for measuring the temperature of the debris shield, and in response to the temperature reading determining which heating cells on the shield to activate.

According to one embodiment of the present invention, a shield, preferably of rectangular or square shape, is mounted on any side of a vehicle's ground engaging means. In most instances the shield will be mounted behind a vehicle's tire where traditional mud flaps are located.

Within or on the shield, a heating element traverses from side to side, following a generally serpentine path. The heating element is connected to a power source, which can include either the vehicle's power source itself or a separate power source, including an independent battery, an AC power source or a DC power source. A temperature sensing device, most likely a thermocouple, and a moisture level sensing device, most likely a hygrometer, are connected either in parallel or in series to a comparator. The temperature sensing device detects the ambient temperature to which the shield is exposed and the moisture sensing device detects the relative atmospheric moisture level to which the shield is exposed. Simultaneously, a comparator, an electronic circuit, receives each signal containing temperature and moisture level information, and compares the combined measurements with pre-set data. If the combined value converges upon a predetermined set point, the comparator will close the circuit allowing power to flow from the power source to the heating element. If the combined value does not reach the predetermined set point, the circuit will remain open and the current will not be supplied to the heating element. In this manner, the electrical resistant heating element will only be activated when required by atmospheric conditions. This, in turn, will lead to extended life of the heated shield itself.

A second embodiment of the present invention employs a closed-loop system, wherein the temperature of the shield itself is measured and is relayed back to the comparator.

This acts as a second input variable concerning when to supply power to the heating element. In doing so, the closed-loop system will be more responsive to the actual conditions of the shield, rather than merely analyzing the atmospheric conditions surrounding the shield.

A third embodiment of the present invention employs a shield having a plurality of heating cells and further having a RTD. In this embodiment, a chip pulses one of the heating cells and the RTD relays signals back to the chip representative of the temperature of the area within the cell. If the temperature of the area within the cell does not reach 33° F. within a certain period of time, this is an indication that the shield is frozen and ice has formed on the shield. Power is then sent to the remaining cells to heat the entire shield and melt the ice formation. Once the temperature reaches 33° F. the power is shut off to the cells and the pulsing process begins again.

Other advantages and aspects of the present invention will become apparent upon reading the following description of the drawings and detailed description of the invention.

DETAILED DESCRIPTION

Figure 1:
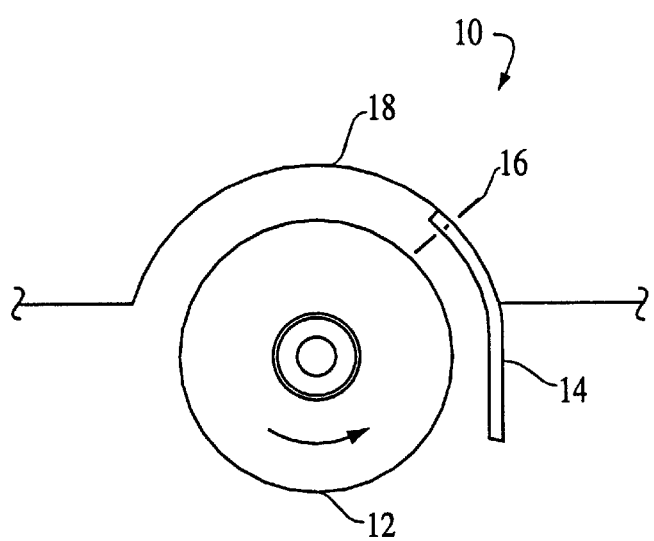
FIG. 1 is a side view of a vehicle wheel and heated debris shield according to the present invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

Figure 2:
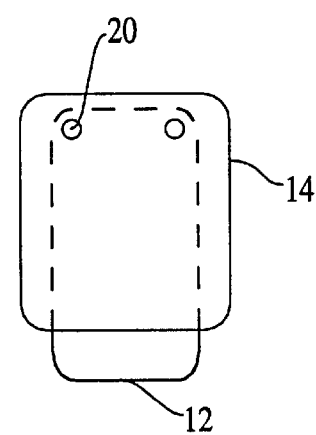
FIG. 2 is a rear view of the heated debris shield and vehicle tire according to the present invention.

The present invention provides an apparatus 10 to substantially reduce and remove any accumulation of snow and ice proximate a vehicle's ground engaging means 12. FIG. 1 shows a side view of a vehicle tire 12. A heated debris shield 14 is located proximate the vehicle's tire 12. In most instances the shield 14 will be mounted similar to a traditional mud flap, but variations of shield housing 16 allows for mounting in front, above or on the side of the vehicle's ground engaging means 12. Preferably, the debris shield 14 is attached to the vehicle by bolting the debris shield 14 to the vehicle's housing 18. FIG. 2 shows the debris shield 14 in relation to the vehicle's tire 12 when the debris shield 14 is mounted behind a vehicle's tire 12, including showing through holes in the shield 14 for mounting purposes.

The shield housing 16 can be made of any durable material, preferably a plastic which is able to withstand high temperatures as required when power is supplied to the heating element. UHMW (ultrahigh molecular weight polyethylene) is a particularly good material because of its low weight, ability to withstand high temperatures, low coefficient of friction and high durability. It is also possible to use other polymeric materials including, but not limited to, polypropylene, polyvinyl chloride, polyurethane, polybutadiene, and natural rubber. It is also possible to use other such materials as metals, metal alloys and wood.

Figure 3:
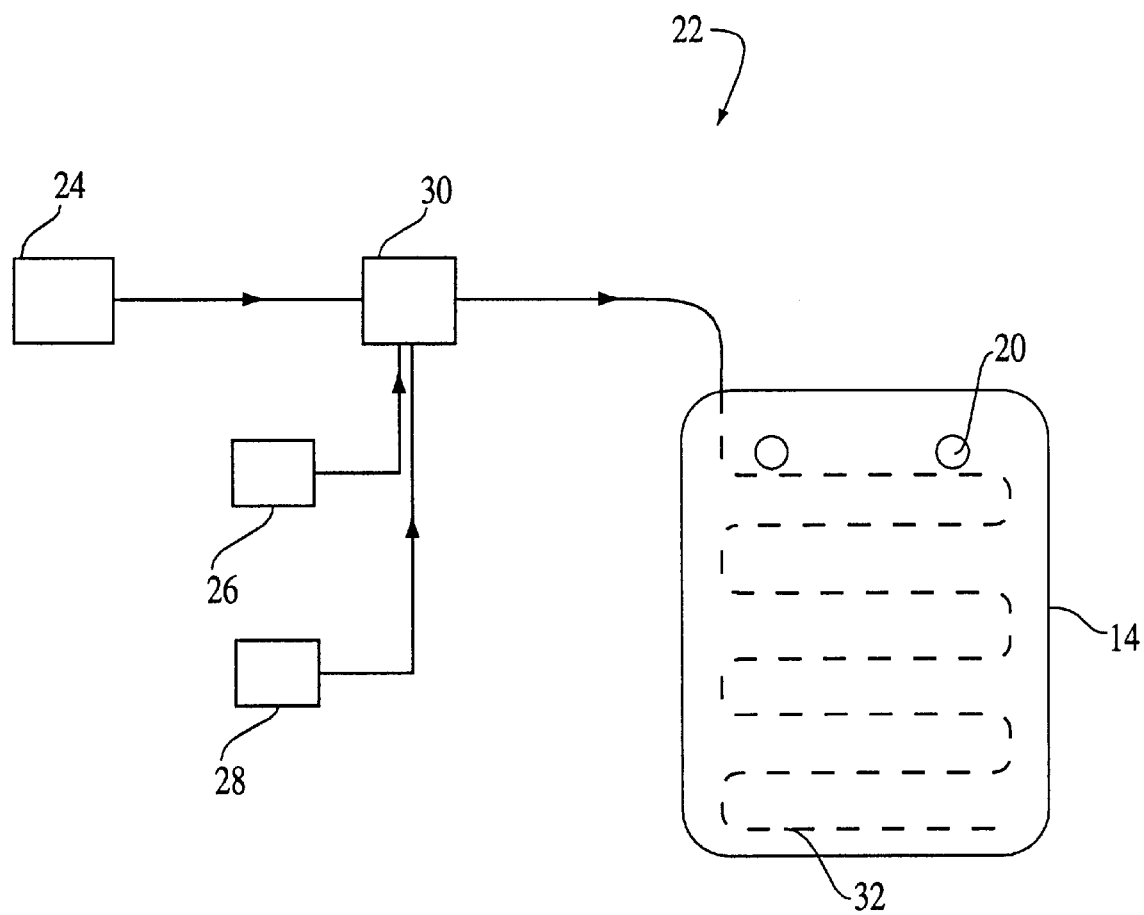
FIG. 3 is a schematic view of the complete device.

FIG. 3 shows one embodiment of the overall electromechanical system 22. This embodiment of the overall system 22 includes a power source 24, a temperature sensing device 26, a moisture sensing device 28, a comparator device 30, and a heating element 32. In this embodiment, the power source 24 is preferably the vehicle's battery, but can be any independent voltage source. The temperature sensing device 26 is used to measure the ambient outside temperature to which the shield 14 is exposed, and is capable of generating a signal representative of the ambient temperature. This temperature sensing device 26 is typically a standard thermocouple. Likewise, the moisture level to which the shield 14 is exposed is measured by a standard moisture sensing device 28 which is capable of generating a signal representative of the ambient moisture level. The temperature sensing device 26 and the moisture sensing device 28 are connected to the comparator 30, so that their respective signals may be reported to the comparator 30.

The comparator 30 is an electronic circuit which receives signals and compares the values of the signals either to each other, or to pre-recorded figures. Therefore, in this embodiment, as the comparator receives the temperature and moisture level signals, it compares these combined values with pre-set data. If the combined value converges upon a predetermined set point, the comparator 30 will close the circuit, essentially acting as an "on" switch, thereby allowing current to flow from the power source 24 to the heating element 32 (See FIG. 8). However, if the combined value does not reach the pre-set point, the circuit will remain open, essentially an "off" configuration, with no current flowing to the heating element 32 (See FIG. 8).

As further seen in FIG. 3, a heating element 32 traverses between lateral edges of the shield 14, following generally a serpentine path across the shield 14. The heating element 32 is essentially an electric resistor. When current is allowed to flow from the power source 24 to the heating element 32, the properties of the heating element 32 are such that it opposes the passage of current, causing electric energy to be transformed into heat.

The system 22 can also be operated by an independent voltage source 24, supplying a separate or independent current to the heating element 32. One example of an independent power source 24 is through the use of a low voltage battery to supply current to the heating element 32. This embodiment allows for a low cost retrofit unit that does not have to be connected to the vehicle's battery.

Figure 4:
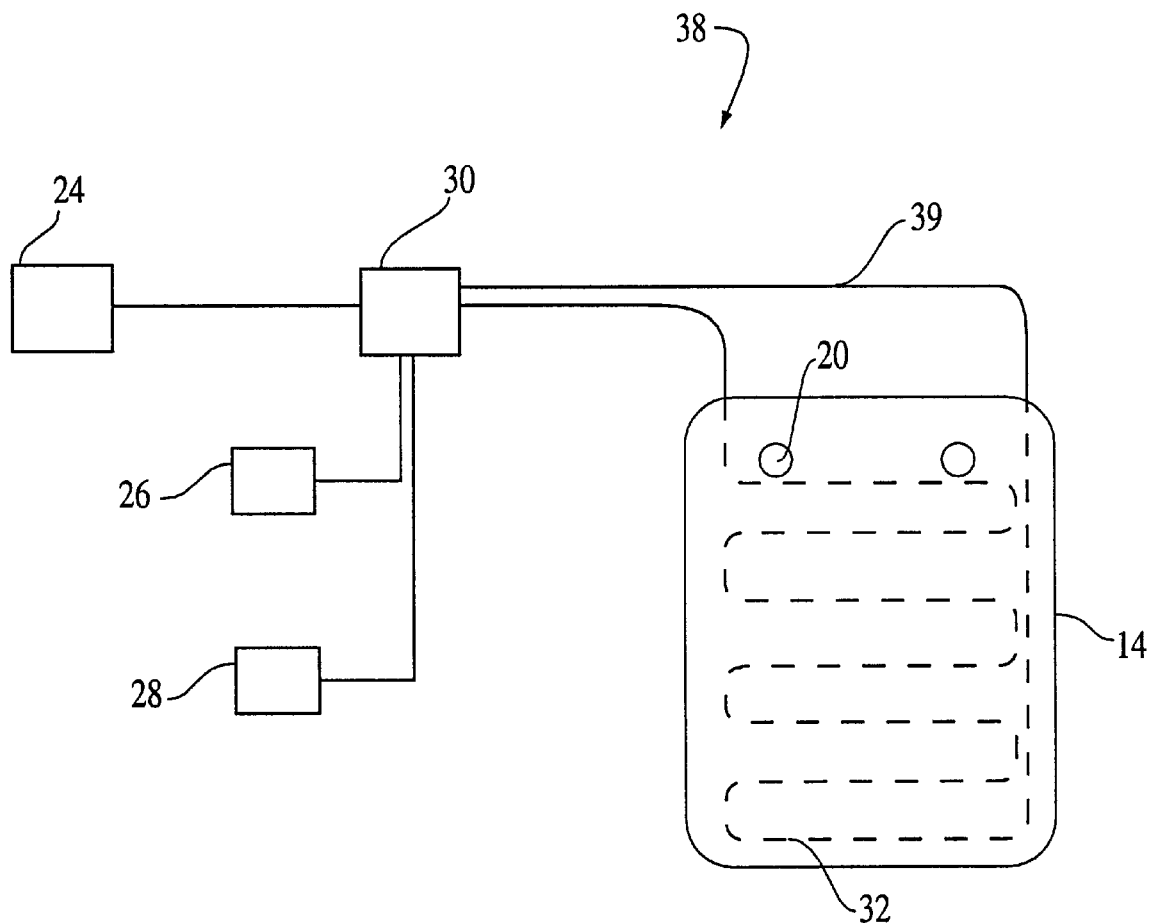
FIG. 4 is a view of the complete device, including a closed-loop temperature feedback system.

FIG. 4 displays another embodiment of the present invention which employs the use of a closed-loop system 38. By employing a closed-loop system 38, the temperature of the shield 14 can be measured and relayed through the line 39 back to the comparator 30. This separate temperature signal acts as a second variable, independent of the temperature and moisture level signals seen above, and allows the system 22 to cut power to the heating element 32 when it reaches a designated temperature. This signal may be referred to as the shield temperature signal as opposed to the ambient temperature signal generated by the temperature sensor 26. In this manner, the closed-loop system 38 is more responsive to the actual conditions of the shield 14, rather than merely responding to the surrounding conditions.

Figure 5:
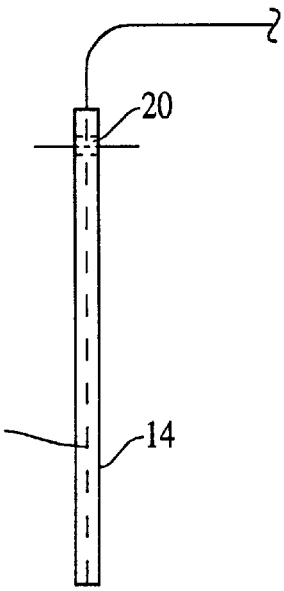
FIG. 5 is a side view of the heated debris shield wherein the heating element is fixed inside the shield.
Figure 6:
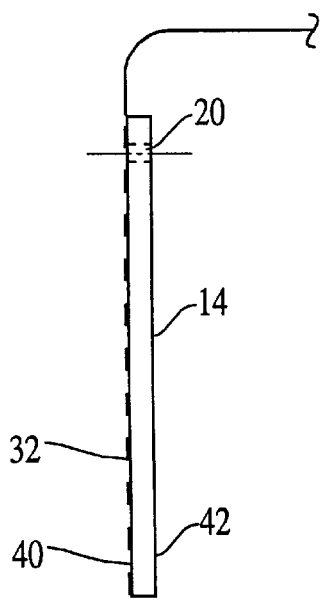
FIG. 6 is a side view of the heated debris shield wherein the heating element is on the outside surface of the shield.

As seen in FIGS. 5 and 6, the heating element 32 can be placed within or on the shield housing 16 in a variety of ways. Specifically, FIG. 5 displays the heating element 32 molded within the shield housing 16. In this manner, the heating element 32 is protected from the outside elements by the shield housing 16. However, depending upon the thermal conductive properties of the material used in shield housing 16, the system 22 may require longer "on" periods to melt and remove the frozen ice which may accumulate on the debris shield 14.

FIG. 6 displays the shield having opposed outer surfaces 40 and 42 and the heating element 32 located on the outside surface 40. In this manner, the heating element 32 can be placed directly on the surface 40 or 42 where ice or snow may tend to accumulate, allowing the system 22 to be extremely responsive to changing conditions. The benefits of placement in this manner is that any accumulation will be quickly removed, and, if used in conjunction with a closed-loop system 38 (See FIG. 4), the system 38 will be allowed to shut off rapidly, thereby increasing the longevity of the heating element.

While not shown, it would also be possible to provide two heating elements 32 on opposite planar surfaces 40 and 42.

Figure 7:
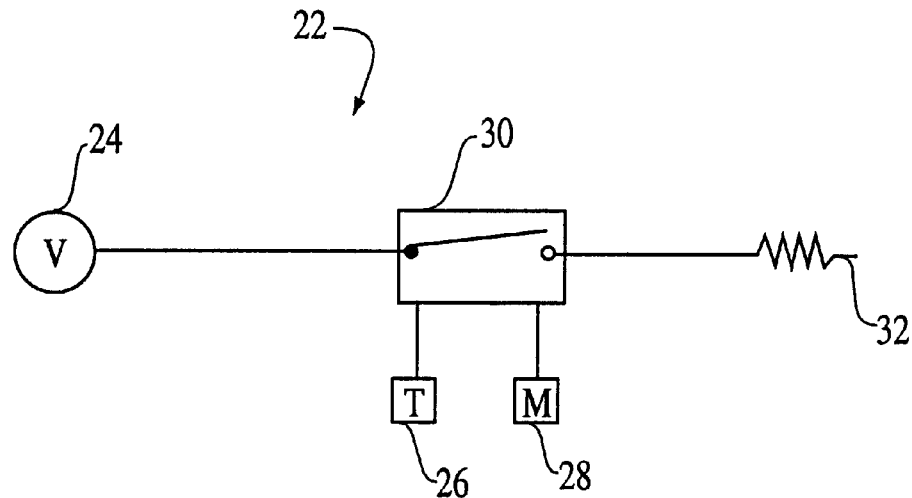
FIG. 7 is a schematic view of the electrical circuit for the open-loop heated debris shield.
Figure 8:
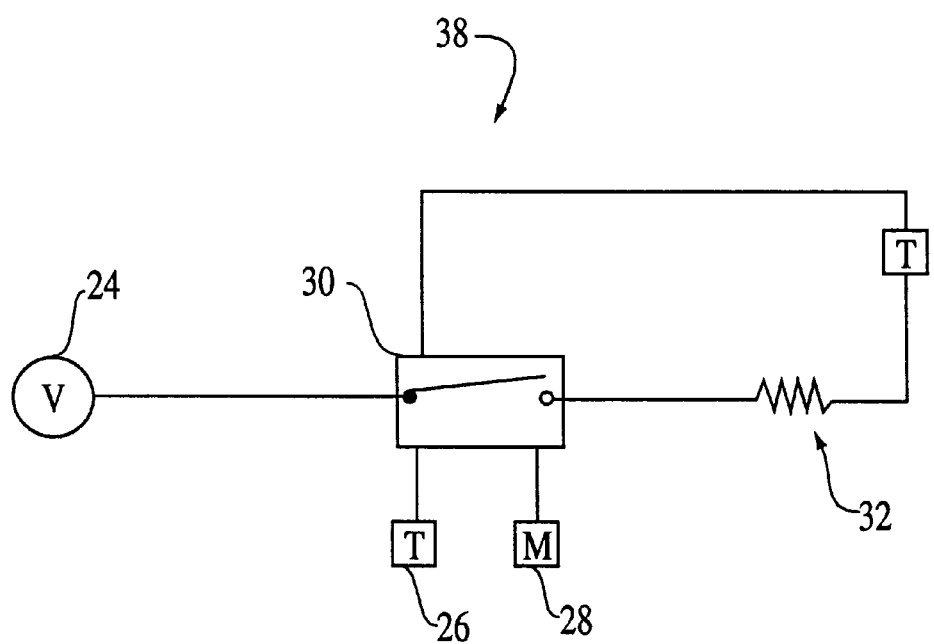
FIG. 8 is a schematic view of the electrical circuit for the closed-loop heated debris shield.

FIGS. 7 and 8 show the electrical schematics of the system. FIG. 7 displays the open-loop system 22, which is solely responsive to outside conditions, and FIG. 8 displays the closed-loop system 38, which allows for feedback from the shield 14.

Figure 9:
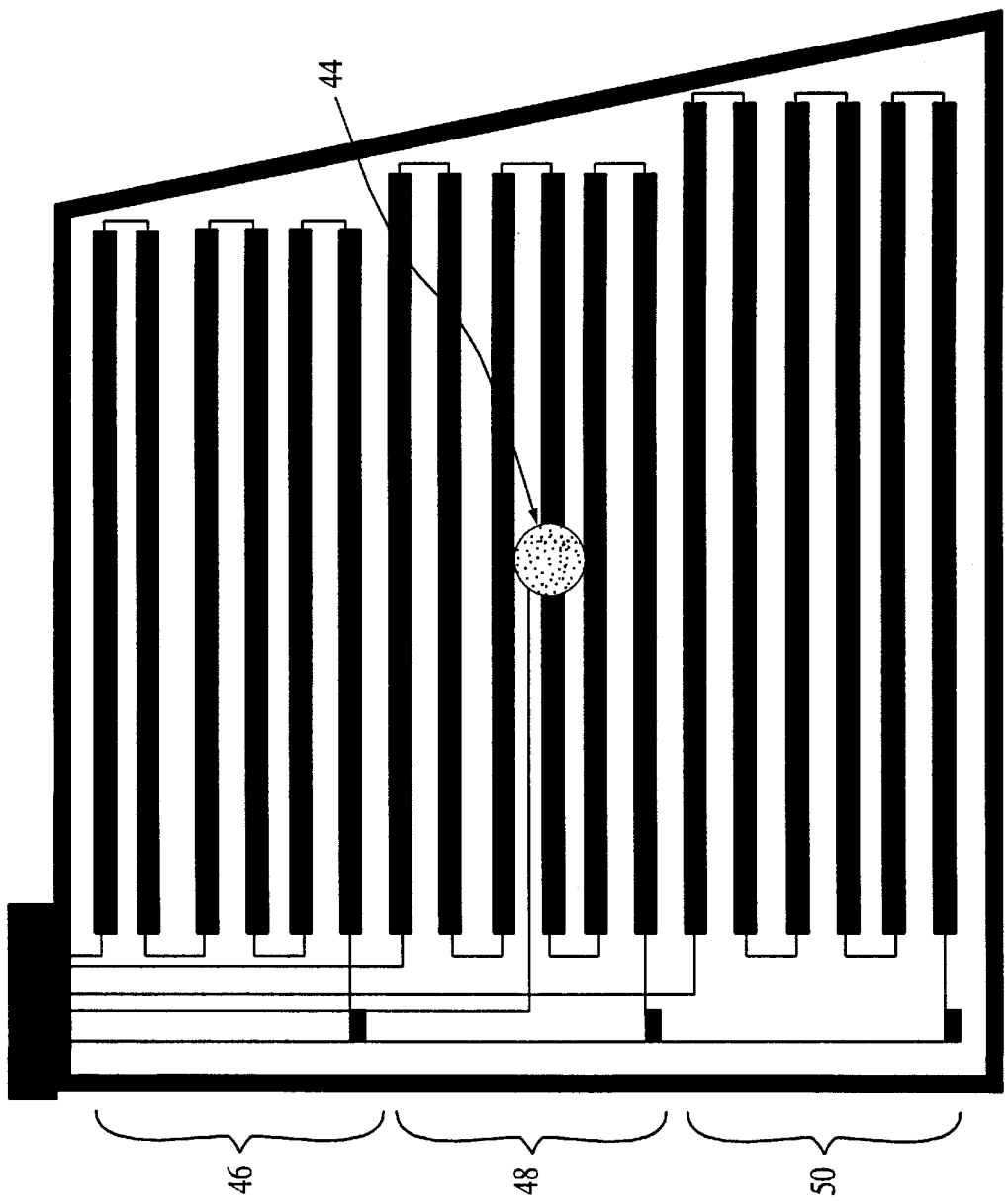
FIG. 9 is a view of the heated debris shield having 3 heating cells and a resistance temperature detector.

FIG. 9 displays a Resistive Temperature Detector (RTD) 44 which is employed in another embodiment of the present invention. The RTD 44 is used in conjunction with at least two heating cells (the shield displayed in FIG. 9 has 3 heating cells shown as 46, 48 and 50). Each cell 46, 48, and 50 is independently linked to the power source 24. When the ambient temperature drops below a given level, one of the heating cells (48 in this embodiment) of debris shield 14 is intermittently pulsed or activated. After being activated for a defined period of time, the RTD 44 relays signals back to the computer containing the temperature of the area within the activated cell 48. If the temperature of the area within the activated cell 48 does not reach 33° F. within a specific period of time, current is sent to the remaining cells 46 and 50 to heat the entire shield 14. All cells 46, 48, 50 remain activated until the temperature of the shield 14 reaches 33° F. Once the temperature of the shield 14 reaches 33° F. current to all cells is stopped and the process proceeds from the beginning again.

While the specific embodiments have been illustrated and described, numerous modifications come to mind without significantly departing from the spirit of the invention and the scope of protection is only limited by the scope of the accompanying claims.

I claim:

1. A heated debris shield for removal of snow and frozen debris adjacent a vehicle's ground engaging means comprising:

a body having at least two heating elements connected to the body;

a resistive temperature detector adjacent one of the heating elements for generating a temperature signal representative of the temperature of the body; and, a means responsive to the temperature signal to independently control power from a power source to the heating elements, wherein a first of the heating elements is intermittently activated when the temperature signal received from the resistive temperature detector indicates that the body has reached a freezing temperature, and wherein another of the heating elements and the first heating element are activated when the temperature signal received from the resistive temperature detector does not reach a set temperature within a predetermined period of time following activation of the first heating element.

2. The heated debris shield of claim 1 wherein the power source is the vehicle power source.

3. The heated debris shield of claim 1 wherein the power source is a separate battery.

4. The apparatus of claim 1 wherein a thermocouple is used for generating a signal representative of the temperature of the body.

* * * * *